Aug. 31, 1937.                H. VON BRAMER                2,091,696
                            ACTIVATION OF CHARCOAL
                             Filed Aug. 14, 1935
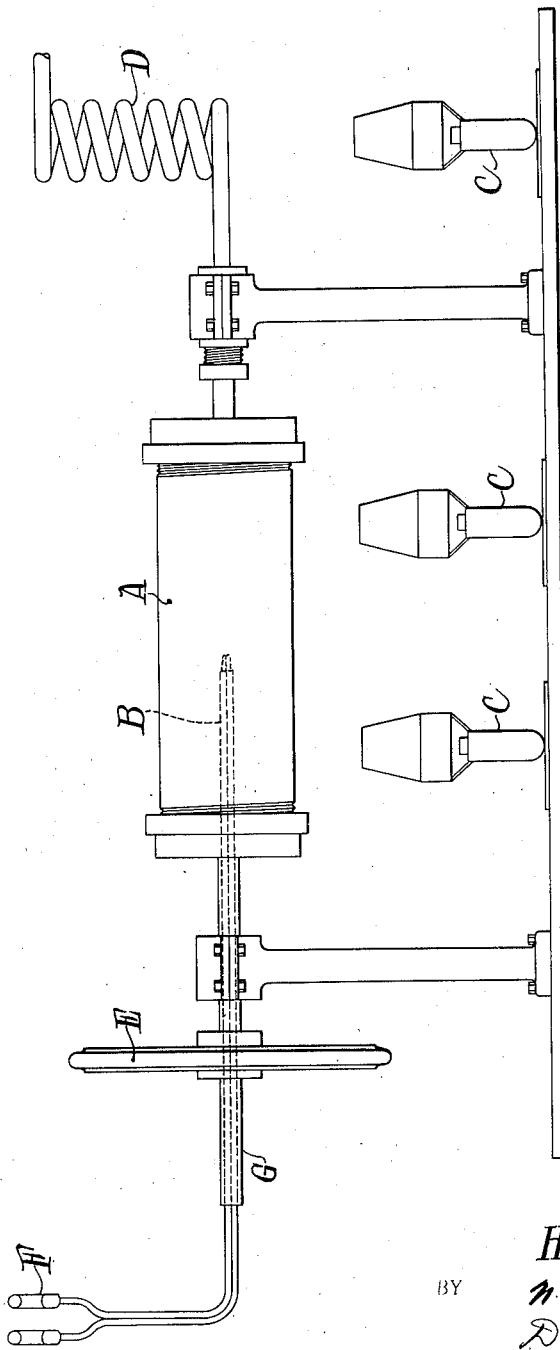
INVENTOR:
Harold Von Bramer,
BY N. M. Perrins
Daniel J. Mayne
ATTORNEYS.

Patented Aug. 31, 1937

2,091,696

UNITED STATES PATENT OFFICE 2,091,696

ACTIVATION OF CHARCOAL

Harold Von Bramer, Kingsport, Tenn., assignor, by mesne assignments, to Eastman Kodak Company, Jersey City, N. J., a corporation of New Jersey Application August 14, 1935, Serial No. 36,158

4 Claims. (Cl. 252—3)

The present invention relates to the activation of charcoal by heating it with manganese dioxide in a non-oxidizing atmosphere.

Heretofore charcoal has been mixed with various prepared inorganic substances such as zinc chloride or chromic acid and heated to activate the same. Nowhere to my knowledge has it been proposed to mix a metallic ore, as it occurs in nature, with the charcoal, thereby serving the double purpose of both activating the charcoal and reducing the ore so that salts may be prepared therefrom.

An object of my invention is to provide a process in which a metallic ore is employed and which involves not only activation of the charcoal but in addition refining of the ore and the production of gas which may be employed for the heating of the reaction materials.

My invention involves the heating together of wood charcoal and manganese dioxide in the presence of an inert gas such as steam, carbon dioxide or nitrogen and in the absence of air or an oxidizing gas such as oxygen or chlorine. The manganese oxide which is present in the finished product may be removed by a mineral acid such as dilute sulfuric.

The accompanying drawing illustrates an apparatus which may be employed in carrying out a process in accordance with my invention. A is the kiln in which the mixture of charcoal and manganese dioxide is placed. The temperature of the kiln is regulated by means of thermocouple B which is connected to a millivoltmeter at F. The temperature of the kiln is maintained by gas burners C as is also the temperature of the coil D through which the steam or other inert gas is passed. E is a sprocket which may be driven by a chain to rotate the kiln during the operation of the process. The outlet G is provided for the escape of gases from the kiln. These gases containing principally carbon monoxide may be utilized or they may be permitted to escape as desired. This outlet may be connected to a dust collector to remove the particles of charcoal and ash from the expelled gases.

The following examples illustrate processes embodying my invention:

Example I

Approximately 122 lbs. of powdered hardwood charcoal (200 mesh) and 340 lbs. of pyrolusite (85% $MnO_2$) were charged into a rotary kiln provided with external heating means and a gas outlet discharging into a dust collector. The air was removed from the apparatus by a current of steam. The kiln was then rotated and heated to 900°–950° F. when the temperature of reaction is reached. The external heat was discontinued but the temperature rose rapidly to 1100° F. due to the exothermic nature of the reaction which occurs. When the temperature began to fall external heat was again applied to maintain the charge at 1100°–1200° F. for approximately an hour.

The batch was then cooled in the absence of air and was discharged directly into 3500 lbs. of water. The whole was agitated and 390 lbs. of concentrated sulfuric acid was slowly added. The treatment was continued until all the manganous oxide has been dissolved. It was then filtered and washed thoroughly.

The manganese sulfate may be recovered from the liquid in any desired manner, for instance by crystallization. The activated charcoal was dried in the absence of air or gases which might be absorbed.

Example II

Approximately 400 lbs. of sawdust (60 mesh) and 340 lbs. of pyrolusite (200 mesh, 85% $MnO_2$) were charged into a rotary kiln as employed in Example I and the procedure specified in that example was then followed. Any other comminuted wood such as wood flour, chips or the like which would form charcoal upon retorting in the presence of manganese dioxide can also be employed as the starting material of a process in accordance with my invention.

The activated charcoal prepared by my invention is suitable for use in the various capacities in which activated carbons are employed such as decolorizing and purifying solutions of sugar or other organic compounds, the recovery of vapors, such as of gasoline or solvents in air or gas mixtures, the refining of animal and vegetable oils, etc.

Upon roasting charcoal with manganese dioxide to activate it some of the carbon is oxidized in accordance with the equation, $$MnO_2 + C = MnO + CO$$

Therefore it is necessary that the amount of charcoal employed be sufficient to provide for this oxidation which occurs. It is preferred that the proportion of charcoal to $MnO_2$ be approximately 1:3. Obviously less or greater proportions of charcoal might be used, however, in the former case full efficiency is not obtained while in the latter case the degree of activation will not be as great as when the approximate proportions recited are employed.

Carbon monoxide is formed in the carrying out of my invention and this gas may be supplied to the burners which heat the kiln or it may be employed for any other purpose to which it is adapted.

Although the use of a dust collector is not indispensible, at the time when reaction occurs there is a rapid evolution of carbon monoxide which causes the expulsion of a considerable amount of charcoal dust. The process might be carried out with a current of steam or carbon dioxide passing into the kiln. In that case the current of steam or $CO_2$ will carry particles of charcoal dust out of the kiln.

It is to be noted that the residual charcoal contains the inert matter which was originally present in the pyrolusite. For this reason it is preferred that the pyrolusite used have a high $MnO_2$ content and be free from objectionable ash.

I claim:

1. The process of preparing an activated wood charcoal and recovering manganese from pyrolusite which comprises mixing comminuted wood or wood charcoal with pyrolusite so that the amount of $MnO_2$ is greater than the amount of carbon therein, heating the mixture to 900–950° F., continuing the external heating until the temperature begins to fall then maintaining the mass at 1100–1200° F. until the desired activation is attained, all the heating being carried out in the presence of an inert gas, cooling the mass under non-oxidizing conditions and then separating the manganese from the charcoal by treating with a dilute mineral acid.

2. The process of preparing an activated wood charcoal and recovering manganese from pyrolusite which comprises mixing comminuted wood or wood charcoal with pyrolusite so that the amount of $MnO_2$ is greater than the amount of carbon therein, heating the mixture to 900–950° F., continuing the external heating until the temperature begins to fall then maintaining the mass at 1100–1200° F. until the desired activation is attained, all the heating being carried out in the presence of steam, cooling the mass under non-oxidizing conditions and then separating the manganese from the charcoal by treating with a dilute acid.

3. The process of preparing an activated wood charcoal and recovering manganese from pyrolusite which comprises mixing comminuted wood or wood charcoal with pyrolusite so that the amount of $MnO_2$ is greater than the amount of carbon therein, heating the mixture to 900–950° F., continuing the external heating until the temperature begins to fall then maintaining the mass at 1100–1200° F. until the desired activation is attained, all the heating being carried out in the presence of carbon dioxide, cooling the mass under non-oxidizing conditions and then separating the manganese from the charcoal by treating with a dilute mineral acid.

4. The process of preparing an activated wood charcoal and recovering manganese from pyrolusite which comprises mixing comminuted wood or wood charcoal with pyrolusite so that the amount of $MnO_2$ is approximately three times the amount of carbon present, heating the mixture to 900–950° F. continuing the external heating until the temperature begins to fall then maintaining the mass at 1100–1200° F., until the desired activation is attained, all the heating being carried out in the presence of an inert gas, cooling the mass under non-oxidizing conditions and then separating the manganese from the charcoal by treating with a dilute mineral acid.

HAROLD VON BRAMER.